United States Patent Office 3,549,518
Patented Dec. 22, 1970

3,549,518
MIXED NONNOBLE METAL CATALYST
COMPOSITIONS AND PROCESSES UTI-
LIZING SAME
Ralph Burgess Mason, Denham Springs, and Glen Porter
Hamner, Baton Rouge, La., assignors to Esso Research
and Engineering Company, a corporation of Delaware
No Drawing. Continuation-in-part of application Ser. No.
622,482, Mar. 13, 1967, which is a continuation-in-part
of application Ser. No. 538,222, Mar. 29, 1966. This
application June 10, 1968, Ser. No. 735,555
Int. Cl. B01j *11/26;* C10g *13/04*
U.S. Cl. 208—111
18 Claims

ABSTRACT OF THE DISCLOSURE

Improved catalyst compositions particularly useful in hydrocarbon conversion processes comprising a crystalline zeolite catalyst support base having ion-exchangeable sites steamed which has been exchanged with a mixture of nonnoble metal constituents. Preferably the base is exchanged with a first nonnoble metal and the resulting composition is then treated with a second nonnoble metal which is in an opposite valence form with respect to the first nonnoble metal and which is reactable with the aforesaid first nonnoble metal to yield a mixed nonnoble metal compound at the ion-exchangeable sites of the catalyst support material. For example, a crystalline aluminosilicate zeolite molecular sieve, preferably in the ammonium form, is steamed and ion exchanged with nickel cations and the resulting nickel ammonium zeolite is treated with a solution of ammonium tungstate to yield a nickel tungstate on ammonium zeolite. This material is a superior hydrocarbon conversion catalyst.

CROSS-REFERENCES TO RELATED APPLICATIONS

This application is a continuation-in-part of Ser. No. 622,482, filed Mar. 13, 1967, now Pat. No. 3,392,108, which, in turn, was a continuation-in-part of Ser. No. 538,222, filed Mar. 29, 1966, now Pat. No. 3,392,106.

BACKGROUND OF THE INVENTION

The present invention concerns improved catalyst compositions for use in petroleum conversion reactions. In particular, the present invention concerns mixed nonnoble metal catalysts which show unexpectedly high activity in petroleum hydrocarbon conversion reactions occurring in the presence of an added reducing gas, such as hydrogen. More specifically, the present invention relates to a technique for preparing catalyst compositions wherein a crystalline zeolite catalyst support material having ion-exchangeable sites is steamed and exchanged with a first nonnoble metal and the resulting nonnoble metal-exchanged catalyst is treated with a second nonnoble metal which is in an ionic charge state opposite to that of the exchangeable nonnoble metal whereby a catalytically active composite of both nonnoble metals is formed at the ion-exchange sites of said catalyst support material.

The mixed nonnoble metal catalyst composites of the present invention are useful in hydrocarbon conversion processes which require catalysts having a substantial hydrogenation-dehydrogenation activity. These processes include, for example, hydrocracking, hydroforming, hydroisomerization, hydrotreating (both for desulfurization and denitrogenation), hydrodealkylation, disproportionation, hydrogenation, and other related reactions.

It has been known in the art to utilize mixed metal catalyst compositions in various hydrocarbon conversion processes. The early catalyst utilized for this purpose comprised an amorphous catalyst base, such as alumina, which was impregnated with the desired combination of metals in the form of sulfides or oxides.

The metal components were generally introduced into the amorphous support material by wet impregnation of the support with a water-soluble compound of the desired metal or metals. An example of such technique is to be found in U.S. Pat. No. 2,840,529 and further with respect to mixed metal amorphous catalysts in U.S. Pat. No. 2,983,691. It has also been known to coprecipitate two or more metals from an aqueous solution onto an amorphous support, such as silica-alumina, to prepare catalyst compositions which are useful in hydrocarbon conversion. In this regard, see U.S. Pat. No. 3,147,208 and also U.S. Pat. No. 3,073,777.

It has additionally been known to utilize crystalline aluminosilicate zelites as catalyst base materials for mixed metal hydrogenation components. U.S. Pat. No. 3,259,564 discloses a crystalline synthetic mordenite zeolite which is treated by cation exchange with various metals and then is subsequently treated with a noble metal, i.e., a platinum group metal to deposit the latter metal thereon. Other crystalline aluminosilicate zeolites have been used as catalyst support materials. For example, in U.S. Pat. No. 2,983,670, a type 13 X molecular sieve was impregnated with combinations of metals in Groups VB, VIB, VIIB and VIIIB by treating the sieve with aqueous solutions of the desired metal compounds. The condition selected for impregnation resulted in little or no exchange of the lattice ions. Both patents relating to mixed metal-containing zeolites disclose the use of such compositions in hydrocarbon conversion processes. A specific disclosure of the use of a mixture of a Group VI and a Group VIII metal on a crystalline aluminosilicate is given in U.S. Pats. 3,159,564 and 3,265,610. There is no teaching in these patents with respect to the manner in which these metals are introduced onto the molecular sieve carrier nor the beneficial effect of steaming the zeolite base.

SUMMARY OF THE INVENTION

The present invention relates to an improved mixed nonnoble metal hydrocarbon conversion catalyst and methods for preparing same. Previous techniques utilized in the art for preparing mixed metal catalysts involved the use of either multiple impregnation techniques wherein a catalyst support material was treated with aqueous solutions of soluble compounds of the desired metals or, alternatively, the art employed either single or multiple cation-exchange methods to introduce certain metals into the ion-exchange sites of specific catalyst support materials, such as the crystalline aluminosilicate zeolites.

It has now been found and, as such, forms the basis for the present invention, that superior mixed nonnoble metal zeolite catalysts can be prepared by utilizing a combination of a steaming and an ion-exchange step, wherein a first nonnoble metal component is introduced into the ion-exchange sites of the catalyst support material followed by a treating step. In the treating step the ion-exchanged catalyst is contacted with a solution containing a second nonnoble metal which is in the opposite valence form than the metal introduced by ion exchange. A mixed nonnoble metal composite is believed to be formed at the ion-exchange sites of the catalyst support material due to a chemical interaction between the two aforesaid nonnoble metals.

By utilizing the preparative process of the present invention, it is possible to obtain a catalyst composition having the mixed nonnoble metal component present in a highly dispersed form on a crystalline zeolite base of greatly enhanced characteristics. This results in superior catalyst activity, selectivity and resistance to deactivation due to the presence of catalyst poisons in the feed stream when such catalysts are compared with catalysts of similar gross composition but which are prepared by conventional techniques known to the art.

DESCRIPTION OF THE PREFERRED EMBODIMENTS

The nonnoble metals which may be utilized in the practice of the present invention can most conveniently be those metals which are normally in the cationic form in solution. Included in this group are the metals of Groups IB, IIB and the nonnoble metal members of Group VIII of the Periodic Table (Handbook of Chemistry and Physics, 38th edition, Chemical Rubber Publishing Company). Particularly desirable cationic metals include copper, zinc, cadmium, mercury, iron, cobalt and nickel. Most preferred metals for use as the cationic component include zinc, cobalt and nickel.

With the crystalline zeolite catalyst support material having cation-exchange sites, the aforementioned nonnoble metals are preferably utilized to effect a 60 to 98%, e.g., 70 to 95%, ion exchange in the aforesaid support. The ion-exchange procedure which may be utilized is one well known in the art and involves contacting the catalyst support material with an aqueous solution of the desired metal compound, e.g., as the chloride, nitrate, etc., so as to replace at least a portion of the cations which were previously associated with the cation-exchange site of the catalyst support material. Multiple exchanges may be utilized to increase the total amount of cation sites exchanged.

The second nonnoble metal component comprises those metals which are normally associated in solution with an anionic radical and generally comprise the oxides or sulfides of the metals in Groups VB and VIB. The particularly preferred metals from this group comprise molybdenum and tungsten.

It is desirable to first treat the crystalline zeolite with a nonnoble metal cationic component as described above. The resulting exchanged catalyst support material is then contacted with either an ammoniacal or alkaline solution of the desired Group VB or VIB metal as the oxide or sulfide or mixtures thereof. Since the latter materials are in the anionic form, they will not ion exchange into the catalyst support material but, rather, will interact with the nonnoble metal cation component to form a mixed nonnoble metal catalyst composite at or near the ion-exchange sites on the catalyst support material. It is believed that the ammonium ions which were associated with the anionic nonnoble metal component in solution back exchange onto the cation sites of the catalyst support material to yield the ammonium form of such catalyst. Such back exchange may occur prior to the interaction between the two nonnoble metals and, in fact, may help initiate such interaction by displacing the metal cation component from the catalyst base exchange site.

By utilization of the above technique, it is possible to obtain a catalyst composition which exhibits at least equal and, in many instances, even higher catalyst activity in hydrocarbon conversion processes as compared with that obtained from the use of a platinum group metal on the same catalyst support material. Moreover, steaming of the zeolite base results in further substantial improvement in catalytic activity as compared to unsteamed versions. Whereas the platinum group metals have generally been considered by the art to be the metals of choice for use in most hydrocarbon conversion reactions, the platinum group metals do suffer from a major disadvantage in that they are extremely expensive. Thus, utilization of the improved technique of the present invention to produce catalyst compositions of at least equivalent activity using metals of a substantially lower cost than the platinum group metals results in sbstantial economic savings in the practice of such hydrocarbon conversion processes. Additionally, catalysts prepared in accordance with the present invention unexpectedly exhibit a high degree of resistance to deactivation due to the presence of catalyst poisons in the feed. This property makes these catalysts the catalyst of choice in the conversion of highly refractory, untreated feedstocks.

The crystalline aluminosilicate zeolite catalyst support materials are characterized by their highly ordered crystalline structure and uniformly dimensioned pores and are distinguishable from each other on the basis of composition, crystal structure, adsorption properties, and the like. The term "molecular sieves" is derived from the ability of these zeolite materials to selectively adsorb molecules on the basis of their size and form. The various types of molecular sieves may be classified according to the size of molecules which will be rejected (i.e., not adsorbed) by a particular sieve. A number of these zeolite materials are described, for example, in U.S. Pats. 3,013,982–86 wherein they are characterized by their composition and X-ray diffraction characteristics. In addition to their extensive use as adsorbents for hydrocarbon separation processes and the like, it has recently been found that crystalline aluminosilicate zeolites, particularly after cation exchange to reduce alkali metal oxide content, are valuable catalytic materials for various processes, particularly hydrocarbon conversion processes.

In general, the chemical formula of anhydrous crystalline aluminosilicate zeolites expressed in terms of moles may be generally represented as:

$$0.9 \pm 0.2 \frac{M_2O}{n} : Al_2O_3 : X\ SiO_2$$

wherein M is a metal cation; $n$ is its valence; and X is a number from about 1.5 to about 12, said value being dependent upon the particular type of zeolite. The zeolite, as synthetically produced or as found naturally, normally contains an alkaline metal, such as sodium or potassium, or an alkaline earth metal, such as calcium. Among the well-known natural zeolites are mordenite, faujasite, chabazite, gmelinite, analcite, erionite, etc. Such zeolites differ in structure, composition, and particularly in the ratio of silica to alumina contained in the crystal lattice structure. Similarly, the various types of synthetic crystalline zeolites, e.g., synthetic faujasite, mordenite, etc., will also have varying silica to alumina ratios depending upon such variables as composition of the crystallization mixture, reaction conditions, etc. The pore size of these zeolites is uniform and in the general range of 4 to 15 angstrom units. The large pore zeolites, e.g., faujasite, will have pores in the range of 6 to 15 A.

For use in hydrocarbon conversion processes, the higher silica to alumina zeolites will be preferred because of their higher stability at elevated temperature. Thereamong these is the synthetic faujasite variety, wherein X fore, whereas the present invention contemplates the use of zeolites in general, those having silica to alumina mole ratios above about 3 will be especially preferred. Typical in the above formula is about 3 to 7, preferably 3 to 6, most preferably 4 to 5.5, and the synthetic mordenite variety, wherein X is about 8 to 12, preferably 9.5 to 10.5. The steaming of the zeolite, in accordance with this invention, serves to effectively increase the silica to alumina mole ratio by selective removal of alumina. Thus, faujasite type zeolites having silica to alumina mole ratios as high as 20 or even higher and mordenite type zeolites having silica to alumina mole ratios of 100 or even higher are formed and preferred for use in the practice of the present invention. Zeolites having the crystal structure of erionite which are enhanced in their relative silica content by selective removal of alumina are also preferred catalyst support materials. The steaming of the zeolite base is preferably performed prior to the cation exchange of the zeolite with the aforesaid Group IB, IIB or VIII nonnoble metal. Preferred steaming conditions include a temperature of 1000° F. to 1300° F. for a period of from about 0.5 to 4 hours. Such treatment will further be preferably performed when the zeolite crystals have been composited into pellets with a suitable binder material such as a hydrogel of an inorganic oxide, clay, or mixtures thereof. A preferred binder will be silica-alumina, e.g., 87% SiO$_2$=13% Al$_2$O$_3$. The preferred amount of binder will usually be in the range of about 15 to 50 wt. percent, e.g., 20 to 40 wt. percent. Steaming may also be beneficially performed on the zeolite per se.

It will be further preferred, though not necessary, to exchange the zeolite with ammonium ion to reduce its Na content to about 1.5 to 6.0 wt. percent Na$_2$O, preferably 2.0 to 4.0 wt. percent. Preferably, this step is performed prior to the metals exchange and treatment and, most preferably, subsequent to inclusion of the binder and prior to steaming.

The crystalline aluminosilicate zeolite which has been cation exchanged with the nonnoble metal component above is converted to the mixed nonnoble metal catalyst composition by treating it with either an ammoniacal or alkaline solution of a selective metal from Group VB or Group VIB as the oxide or sulfide. It is desirable that from about 3 to 25 wt. percent, based on the total catalyst composition of the Group VB or Group VIB metal be introduced into the molecular sieve, preferably from about 5 to 15 wt. percent. It is also contemplated to utilize mixtures of Group VB or Group VIB metals. For example, the cation exchanged zeolite may be treated with a solution containing the desired form of molybdenum and tungsten or alternatively the zeolite may be treated serially with solutions of each so as to form a cation molybdate-tungstate form of the catalyst.

The preferred crystalline aluminosilicate zeolite molecular sieves include faujasites which have been treated in accordance with the process of the present invention to yield mixed nonnoble metal composites thereon which comprise zinc molybdate, zinc tungstate, nickel tungstate, nickel molybdate, cobalt molybdate, cobalt tungstate and the corresponding cation molybdate-tungstate modifications.

A particularly preferred embodiment involves the treatment of a sodium faujasite catalyst support material with ammonium ion to convert the faujasite to substantially the ammonium form. This ammonium faujasite is then steam treated and exchanged with a nonnoble metal cation, preferably nickel, so as to exchange some of the ammonium and/or any residual sodium sites with the non- noble metal cation. The resulting metal cation exchanged zeolite is then treated with an ammoniacal solution of the Group VB or Group VIB nonnoble metal, preferably a tungstate or molybdate, in the anionic form, to yield the mixed nonnoble metal composite. As previously indicated, it is believed that the ammonium ions associated with the Group VB or Group VIB metal will effectively backexchange into the cation sites occupied by the nonnoble metal cation. The resulting mixed nonnoble metal composite is distributed extensively and in a highly dispersed form throughout the faujasite base material. The feature of utilizing a steamed catalyst support material which has been initially exchanged with ammonium ions prior to cation exchange with the nonnoble metal cation has been found unexpectedly to yield superior hydrocarbon conversion catalysts.

In still another preferred embodiment of the present invention, crystalline aluminosilicate zeolites having uniform pore openings in the range from about 4 to less than about 6 Angstrom units are utilized as the catalyst support materials. Such small-pore molecular sieve zeolite modifications are useful catalysts in hydroselective reactions, such as selective hydrocracking. Particularly preferred embodiments of small-pore molecular sieves include the hydrogen form of erionite which has been treated in accordance with the present invention to yield a mixed nonnoble metal composite at the exchange sites therein. Particularly preferred embodiments of the small-pore molecular sieves include zinc tungstate zeolite A, zinc molybdate zeolite A, nickel tungstate zeolite A, nickel molybdate zeolite A, zinc tungstate erionite, zinc molybdate erionite, nickel tungstate erionite and nickel molybdate erionite. In each of the foregoing embodiments it should be understood that the zeolite would further include ammonium or hydrogen ions at the cation-exchange sites.

The zeolite A, referred to above, is fully described in U.S. Pat. No. 2,882,243 and has a molar formula in the dehydrated form of:

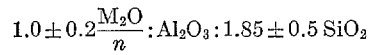

$$1.0 \pm 0.2 \frac{M_2O}{n} : Al_2O_3 : 1.85 \pm 0.5 SiO_2$$

wherein M is a metal cation and $n$ is its valence. The other preferred small-pore form of molecular sieve is the natural or synthetic form of erionite. The naturally-occurring mineral erionite has elliptical pore openings of about 4.7 to 5.2 angstrom units on its major axis. The synthetic form of erionite can be prepared by known methods, such as those disclosed in U.S. Pat. No. 2,950,952. It is characterized by pore openings of approximately 5 angstrom units and differs from the naturally-occurring form in its potassium content and the absence of extraneous metals.

As an additional embodiment of the present invention, it has been found that the activity and effectiveness of the mixed nonnoble metal containing molecular sieves hereinabove described can be substantially improved by contact with sulfur or sulfur-containing compounds either prior to their use in hydrocarbon conversion processes or by conducting the conversion process in the presence of sulfur or sulfur-containing compounds. The zeolite is preferably sulfactivated by contact either with sulfurcontaining feed or, if the feed has a low sulfur content, with hydrogen sulfide or an added sulfur compound which is readily convertible to hydrogen sulfide at the conditions employed, e.g., carbon disulfide and the like. The extent of this sulfactivation treatment should be sufficient to incorporate about 0.5 to 15 wt. percent sulfur into the zeolitic material.

The utilization of catalysts prepared by the process of the present invention is most conveniently evidenced by reference to Table I following.

TABLE I.—MIXED NONNOBLE METAL CATALYSTS IN HYDROCARBON TREATING AND CONVERSION REACTIONS

| Process | Hydrocracking | | Selective hydrocracking | | Hydroisomerization | |
|---|---|---|---|---|---|---|
| Feedstock | Gas oils | | Naphtha and gas oils | | Light naphtha | |
| Catalyst | Ni-W-faujasite | | Zn-W-erionite and zeolite A | | Zn-Mo-mordenite | |
| | Operating | Preferred | Operating | Preferred | Operating | Preferred |
| Operating conditions: | | | | | | |
| Temperature, °F | 500–950 | 700–800 | 600–950 | 700–900 | 200–700 | 250–500 |
| Pressure, p.s.i.g | 400–3,000 | 500–1,500 | 400–1,500 | 500–1,000 | 50–500 | 100–300 |
| Space velocity, v./v./hr | 0.2–10 | 0.5–5 | 0.2–20 | 0.5–1 | 0.5–5 | 1–2 |
| $H_2$ rate, s.c.f./b | 1,000–10,000 | 2,000–5,000 | 1,000–10,000 | 2,000–5,000 | 500–5,000 | 1,000–2,000 |
| Products | Naphtha | | Branched chain and aromatic naphthas and gas oils | | Branched chain naphtha | |

| Process | Hydrotreating | | Selective denitrogenation | | Hydrogenation | |
|---|---|---|---|---|---|---|
| Feedstock | Virgin naphtha, cracked naphtha and kerosene | | Distillate oils | | Olefinic naphthas | |
| | Ni-W-faujasite | | Zn-W-faujasite | | Co-Mo-faujasite | |
| | Operating | Preferred | Operating | Preferred | Operating | Preferred |
| Operating conditions: | | | | | | |
| Temperature, °F | 200–700 | 300–600 | 200–900 | 400–700 | 100–500 | 200–400 |
| Pressure, p.s.i.g | 50–1,000 | 250–500 | 50–1,500 | 200–800 | 500–3,000 | 1,000–2,000 |
| Space velocity, v./v./hr | 0.5–5 | 1–2 | 0.2–5 | 0.5–2 | 0.5–5 | 1–2 |
| $H_2$ rate, s.c.f./b | 500–5,000 | 1,000–2,000 | 500–5,000 | 1,000–2,000 | 1,000–10,000 | 2,000–6,000 |
| Products | Prime fuel, motor gasoline and distillates | | Jet fuel, kerosene, prime fuel distillates | | Paraffinic and/or naphthenic naphthas | |

| Process | Disproportionation | | Hydrodealkylation | | Hydroforming | |
|---|---|---|---|---|---|---|
| Feedstock | Alkyl aromatics and alkyl cyclopentanes | | Alkyl aromatics | | Naphthenic naphthas | |
| Catalyst | Zn-Mo-mordenite | | Ni-W-erionite | | Ni-W-faujasite | |
| | Operating | Preferred | Operating | Preferred | Operating | Preferred |
| Operating conditions: | | | | | | |
| Temperature, °F | 700–950 | 800–900 | 700–1,200 | 800–1,000 | 800–1,000 | 850–950 |
| Pressure, p.s.i.g | 500–2,000 | 700–1,500 | 50–1,500 | 100–1,000 | 50–500 | 100–400 |
| Space velocity, v./v./hr | 0.2–4 | 0.5–2 | 0.2–10 | 0.5–10 | 0.2–10 | 1–5 |
| $H_2$ rate, s.c.f./b | 500–5,000 | 1,000–2,000 | 500–5,000 | 1,000–2,000 | 1,500–10,000 | 4,000–6,000 |
| Products | Benzene | | Benzene and toluene | | Aromatic naphtha | |

Other suitable feedstocks include: refractory gas oils obtained from coking operations, either delayed or fluid coking, gas oils from steam cracking of naptha and gas oil feeds, gas oils from thermal cracking of ethane, butene and propane, gas oils from retorting of shale tar sands and coal, and gas oils containing aromatic extracts from virgin petroleum fractions.

While the above description relates to a particular technique for incorporating the nonnoble metal components, it should be understood that the benefits of using a steamed zeolite base will accrue even if more conventional techniques are employed.

Thus, the nickel tungsten hydrogenation component may be introduced into the crystalline aluminosilicate zeolite by any one of several alternative methods. For example, it is possible to employ impregnation techniques previously used in the art to prepare nickel-tungsten on amorphous base catalysts. These techniques involve treating the catalyst base with solutions containing nickel and tungsten either separately or in combination in a single solution so as to deposit these catalytic materials on the base surface. See in this regard, U.S. Pats. 2,690,433; 3,232,887 and 3,280,040 for descriptions of procedures used in introducing nickel and tungsten onto various types of catalyst support materials.

In any event, the most preferred preparative procedure should result in a catalyst containing from 1 to 8 wt. percent, preferably 2 to 6 wt. percent nickel (based on the metallic form although not necessarily existing as such) and from 3 to 18 wt. percent, preferably 6 to 12 wt. percent of tungsten (based on the metal as above).

EXAMPLE 1

This example compares the catalysts of the present invention to similar catalysts wherein the zeolite base was not steamed, and to commercially used palladium on faujasite catalysts.

The catalysts tested were generally prepared by combining 80 parts of sodium faujasite (in water) with 20 parts of silica-alumina (13 wt. percent $Al_2O_3$) hydrogel. The mixture was stirred, pH adjusted to 5.5–6.0 with dilute $H_2SO_4$ and filtered and dried. The dried solids were $NH_4+$ exchanged with about a 20% $NH_4 NO_3$ solution for the requisite number of exchanges to reduce the $Na_2O$ content and washed and filtered. The solids were dried and steamed at the designated temperatures for the designated times. The steamed solids were exchanged with nickel solution (about 5%

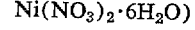
$$Ni(NO_3)_2 \cdot 6H_2O$$

washed and dried at about 300° F. The dried material was impregnated with a tungstate solution made by solubilizing ammonium paratungstate in monoethanol amine and adding enough water to imbibe the catalyst solids. The catalyst was then dried and calcined prior to use.

Such catalysts will typically contain about 0.8 to 1.5 wt. percent Ni, about 10 wt. percent W, and about 0.5 to 1.2 wt. percent $Na_2O$.

Catalysts A and B below were prepared by the above procedure, using 4 and 3 ammonium cation exchanges, respectively. The exchanged composites were examined for sodium oxide content and for relative crystallinity. The samples were then subjected to contact with steam for 4 hours at 1100° F. The relative crystallinity and unit cell sizes of each of the samples were determined. The steamed faujasite catalyst composites were then treated with nickel nitrate solution to yield 0.8 to 1.5 wt. percent nickel on the catalyst. The weight percent of sodium oxide remaining on the zeolite after the nickel exchange was then determined. Finally, the nickel form of the faujasite catalytic composite was impregnated with 10 wt. percent of tungsten (based on final catalyst) by the technique described above. Additionally, the catalytic solids were pilled prior to steaming.

Each of the catalyst samples was then tested for hydrocracking activity. The feed was a highly hydrofined light catalytic cycle oil (boiling from about 400–650° F.) spiked with thiophene equivalent to 0.3 wt. percent S and with n-butylamine equivalent to 0.1 wt. percent N. Operating conditions were approximately 1500 p.s.i.g., 8000 cu. ft. of $H_2$/bbl., 1 v./hr./v., and temperatures in the range of 675°–700° F.

The effect of steaming vs. no steaming is illustrated in the following table:

TABLE II

| Catalyst | A | | B | |
|---|---|---|---|---|
| Starting composition: | | | | |
| Percent Na-faujasite | 80 | | 80 | |
| Percent Binder (87% SiO$_2$-13% Al$_2$O$_3$) | 20 | | 20 | |
| No. of NH$_4$+ exchanges (final pH=8) | 4 | | 3 | |
| Wt. percent Na$_2$O (faujasite only) | 0.5 | | 2.4 | |
| Relative crystallinity [1] | 150 | | 167 | |
| Steaming conditions [2] | Steamed | Not steamed | Steamed | Not steamed |
| Relative crystallinity: [1] | | | | |
| Total composition | 76 | 150 | 144 | 167 |
| Faujasite only | 95 | 187 | 180 | 209 |
| Unit cell size, A | 24.43 | 24.76 | 24.47 | 24.73 |
| Wt. percent Na$_2$O after Ni++ exchange | 0.4 | 0.4 | 0.5 | 1.4 |
| Relative hydrocracking action after impregnation with 10 wt. percent W: [3] | | | | |
| Based on total catalyst | 200 | 115 | 360 | 200 |
| Based on faujasite only | 250 | 145 | 450 | 250 |

[1] Calculated from the average height of the ten strongest peaks in the X-ray diffraction pattern divided by the average height of the same peaks as measured with a standard catalyst, multiplied by 100.
[2] Powder steamed before pilling; steamed four hours at 1,100° F.
[3] Calculated from the space velocity used in the test divided by the space velocity that would be required at otherwise the same process conditions with a standard control catalyst to give the same conversion, multiplied by 100.

The above data demonstrate the beneficial effect of treatment with steam. Omission of the steam treatment step with all other preparation conditions being identical resulted in a catalyst with considerably lower activity; e.g., almost a 50% loss in activity.

EXAMPLE 2

Additional experiments were performed along the lines of Example 1. In addition, a commercial palladium-faujasite catalyst was tested. The data below are self-explanatory.

catalyst of the invention and with the conventional palladium on faujasite catalyst. The results follow:

TABLE IV

| Hydrocracking catalyst | Ni-W-faujasite steamed 1 hr. at 1,100° F. | | Palladium-faujasite | |
|---|---|---|---|---|
| Catalyst age, run hours | 338–358 | 530–550 | 343–363 | 523–543 |
| Space velocity, v./v./hr | 0.75 | 0.93 | 0.78 | 1.02 |
| Pressure, p.s.i.g | 1,431 | 1,542 | 1,609 | 1,627 |
| Average temperature, ° F | 684 | 704 | 682 | 709 |
| Average pretreatment temp., ° F | 733 | 728 | 743 | 736 |
| Corrected conversion, percent | 46.9 | 40.7 | 36.3 | 33.3 |
| Catalyst activity [1] | 0.78 | 0.55 | 0.55 | 0.35 |

[1] Correlated activity.

TABLE III.—EFFECT OF STEAMING ZEOLITE BASE IN PREPARATION OF HYDROCRACKING CATALYSTS; LIGHT CATALYTIC CYCLE OIL FEED FORTIFIED WITH THIOPHENE [1] AND N-BUTYL AMINE [1]

| Catalyst [2] | Pd faujasite (commercial catalyst) | Ni-W faujasite | Ni-W faujasite | Ni-W faujasite | Ni-W faujasite |
|---|---|---|---|---|---|
| Special zeolite treatment | ([3]) | ([3]) | ([4]) | ([4]) | ([4]) |
| Steaming temp., ° F | | | 1,000 | 1,100 | 1,300 |
| Hours steaming | | | 1 | 4 | 4 |
| Operating conditions: | | | | | |
| Hours on stream | 141 | 139 | 166 | 139 | 139 |
| Temperature, ° F | 692 | 677 | 690 | 681 | 685 |
| Pressure, p.s.i.g | 1,500 | 1,500 | 1,500 | 1,500 | 1,500 |
| Feed rate, v./v./hr | 1.00 | 1.03 | 1.0 | 1.0 | 1.06 |
| Exit gas rate, s.c.f./b | 8,000 | 7,770 | 8,000 | 8,000 | 7,550 |
| Liquid product inspections: | | | | | |
| Gravity, ° API | 44.4 | 45.3 | 51.8 | 55.0 | 55.1 |
| D+L at 400° F | 39.0 | 42.0 | 72.5 | 79.0 | 77.0 |
| Estimated conversion, percent | 37 | 41 | 67 | 76 | 76 |
| Percent of reference | 100 | 176 | 304 | 336 | 310 |

[1] Sulfur level 3,000 p.p.m. and nitrogen level 1,000 p.p.m.
[2] Catalyst base consists of 80% faujasite and 20% silica-alumina hydrogel binder.
[3] None.
[4] Steamed.

EXAMPLE 3

Similar results to those shown above were obtained using feedstocks that did not contain the added sulfur and nitrogen simulators. The feed utilized was a high nitrogen, high boiling feed containing 927 p.p.m. nitrogen, 1780 p.p.m. sulfur, and boiling (95%) between 664° F. and 826° F. The feed was passed over conventionally hydrofined catalyst which had little effect upon nitrogen content, and was then hydrocracked with a

What is claimed is:

1. An improved hydrocarbon conversion process which comprises subjecting said hydrocarbons to conversion conditions in the presence of a catalyst comprising a steam-Groups IB, IIB and the nonnoble metals of Group VIII of the Periodic Table of the Elements, said metal having treated crystalline zeolite containing a mixture of nonnoble metals, a first metal component selected from been introduced into the ion-exchange sites of the steam-treated crystalline zeolite in cationic form, and a second metal component selected from Groups VB and VIB of the Periodic Table of the Elements, said metal having been introduced by contact with the steam-treated crystalline zeolite while in anionic form.

2. The process of claim 1 wherein said zeolite is synthetic faujasite.

3. The process of claim 1 wherein said process is hydrocracking and is conducted in the presence of hydrogen.

4. The process of claim 1 wherein said zeolite is substantially in the ammonium form.

5. The process of claim 1 wherein said mixture of non-noble metals comprises nickel and tungsten.

6. An improved catalyst composition comprising a steamed crystalline zeolite base and a mixture of non-noble metals, a first metal component selected from Groups IB, IIB and the nonnoble metals of Group VIII of the Periodic Table of the Elements, said metal having been introduced into the ion-exchange sites of the steam-treated crystalline zeolite in cationic form, and a second nonnoble metal component selected from Groups VB and VIB of the Periodic Table of the Elements, said metal having been introduced by contact with the steam-treated crystalline zeolite while in anionic form.

7. The composition of claim 6 wherein said zeolite is synthetic faujasite.

8. The composition of claim 6 wherein said mixture of non-noble metals comprises nickel and tungsten.

9. The process of claim 1 wherein said mixture of non-noble cationic metals comprises a member selected from the group consisting of copper, zinc, cadmium, mercury, iron, cobalt and nickel, and the nonnoble anionic metals comprise a member selected from the group consisting of molybdenum and tungsten.

10. The composition of claim 6 wherein said mixture of nonnoble cationic metals comprises a member selected from the group consisting of copper, zinc, cadmium, mercury, iron, cobalt and nickel and the nonnoble anionic metals comprise a member selected from the group consisting of molybdenum and tungsten.

11. The process of claim 1 wherein the crystalline zeolite is treated with steam at temperatures ranging from about 1000° F. to about 1300° F. for a period of time ranging from about 0.5 to about 4 hours.

12. The process of claim 11 wherein the crystalline zeolite has been composited with a binder, pelletized and then steamed.

13. The process of claim 12 wherein the binder is silica-alumina in concentration ranging from about 15 to about 50 weight percent.

14. The process of claim 1 wherein the first nonnoble metal component is used to effect a 60 to 98 percent ion exchange with the crystalline zeolite, the metal in anionic form is selected from the group consisting of oxides and sulfides of the VB and VIB metals, and the latter is present in concentration ranging from 3 to 25 weight percent, based on the total catalyst composition.

15. The process of claim 14 wherein 70 to 95 percent of the first nonnoble metal component is ion-exchanged with the crystalline zeolite, and from about 5 to 15 percent of the second nonnoble metal component is composited with the total catalyst composition.

16. The process of claim 4 wherein the treatment with the ammonium ion reduces the sodium content to about 1.5 to 6.0 weight percent $Na_2O$.

17. The process of claim 16 wherein the $Na_2O$ content is reduced from about 2.0 to 4.0 weight percent $Na_2O$.

18. The process of claim 17 wherein the step is performed prior to steaming.

References Cited

UNITED STATES PATENTS

| | | | |
|---|---|---|---|
| 3,236,761 | 2/1966 | Rabo et al. | 208—111 |
| 3,257,310 | 6/1966 | Plank et al. | 208—120 |
| 3,140,251 | 7/1964 | Plank et al. | 208—120 |
| 3,324,047 | 6/1967 | R. C. Hansford | 252—455 |

DELBERT E. GANTZ, Primary Examiner

A. RIMENS, Assistant Examiner

U.S. Cl. X.R.

252—455

PO-1050
(5/69)

UNITED STATES PATENT OFFICE
CERTIFICATE OF CORRECTION

Patent No. 3,549,518            Dated May 28, 1971

Inventor(s) Ralph Burgess Mason and Glen Porter Hamner

It is certified that error appears in the above-identified patent and that said Letters Patent are hereby corrected as shown below:

Column 10, claim 1; line 40 should be interchanged with line 42, and line 41 should be interchanged with line 43.

Lines 39-43 should therefore read as follows:

"...ditions in the presence of a catalyst comprising a stea treated crystalline zeolite containing a mixture of non-noble metals, a first metal component selected from Groups IB, IIB and the nonnoble metals of Group VIII of the Periodic Table of the Elements, said metal having..

Signed and sealed this 24th day of August 1971.

(SEAL)
Attest:

EDWARD M. FLETCHER, JR.
Attesting Officer

WILLIAM E. SCHUYLER, JR.
Commissioner of Patents